Dec. 5, 1933.   G. E. COOK   1,938,416
VENDING MACHINE
Filed Jan. 29, 1930    3 Sheets-Sheet 1
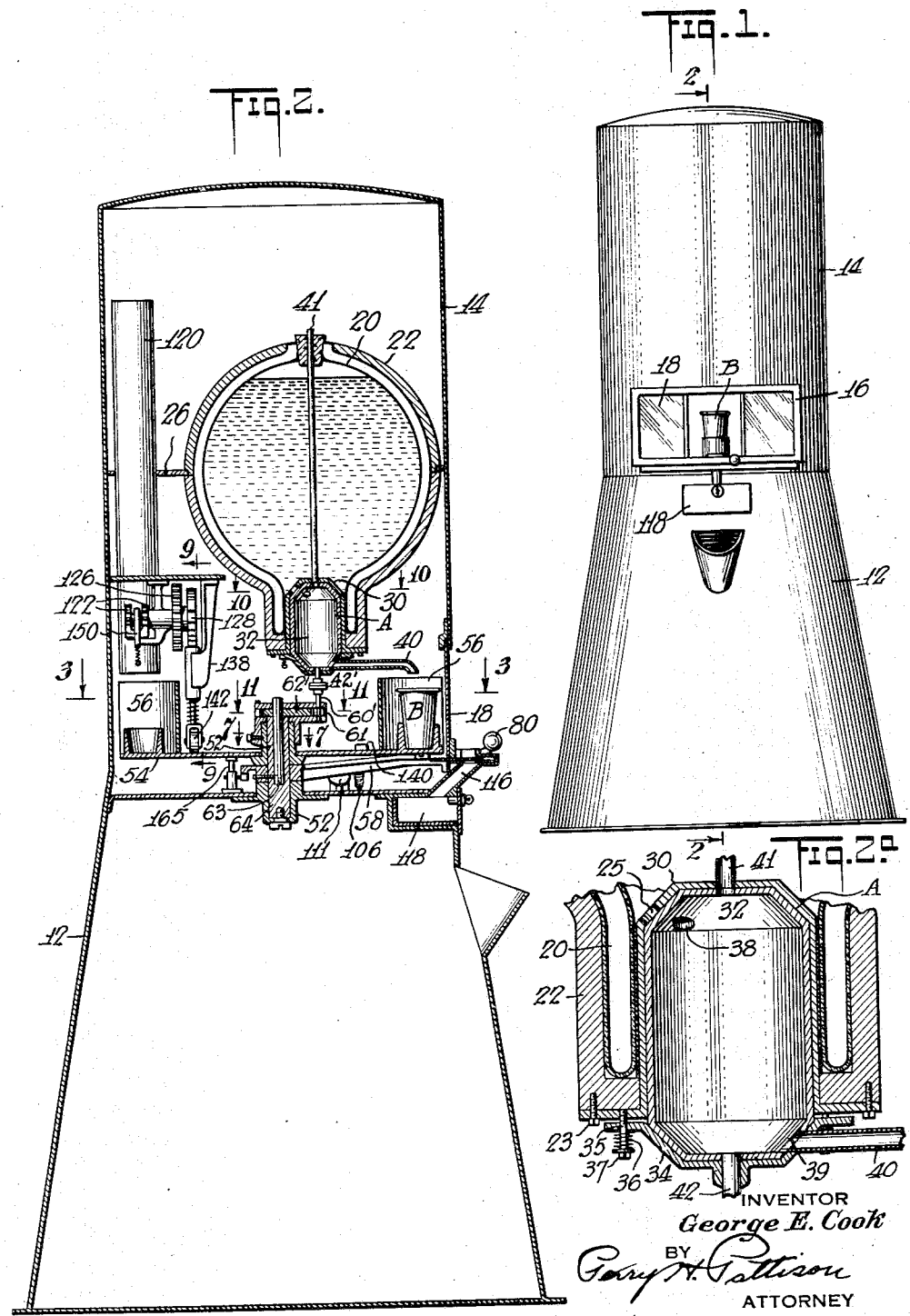
INVENTOR
George E. Cook
BY
ATTORNEY Dec. 5, 1933.  G. E. COOK  1,938,416
VENDING MACHINE
Filed Jan. 29, 1930   3 Sheets-Sheet 2
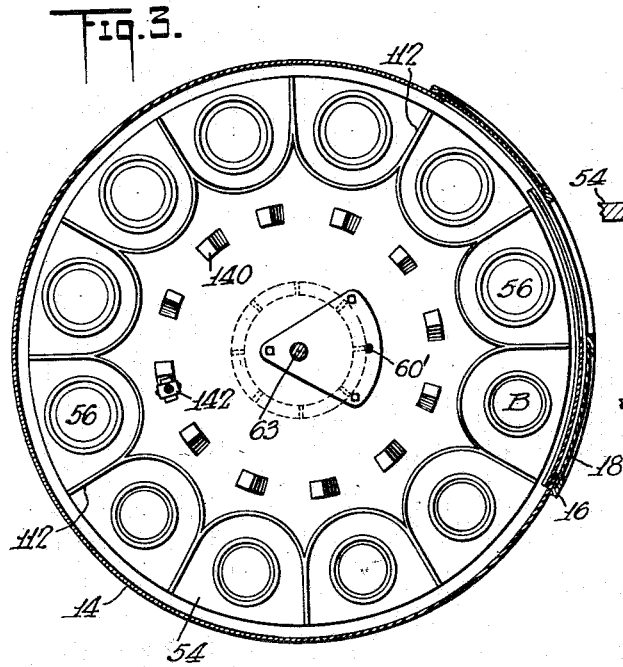
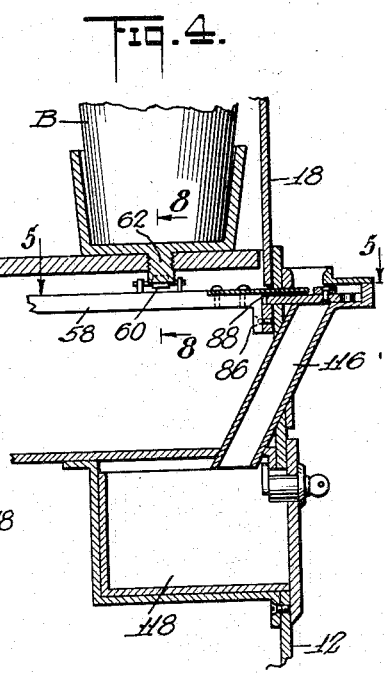
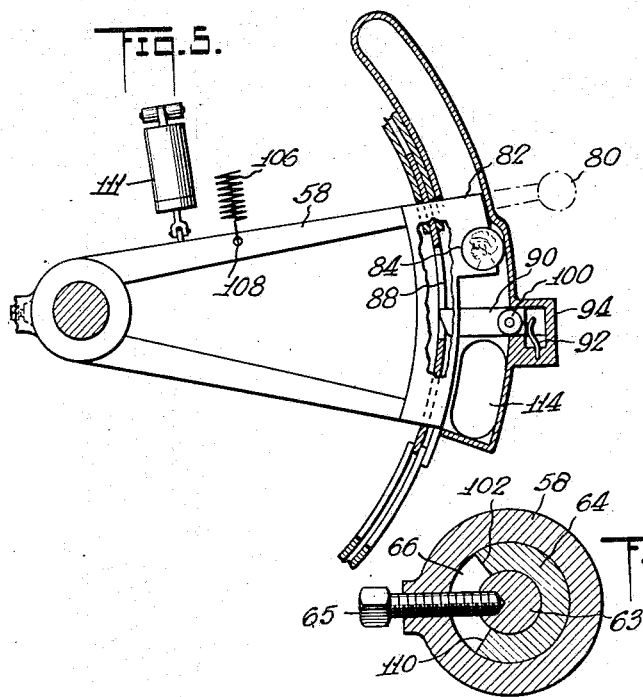
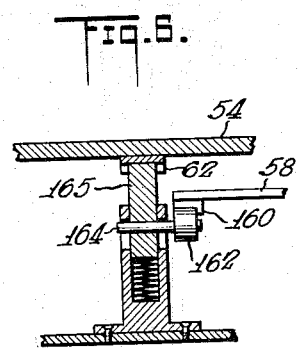
INVENTOR
George E. Cook
BY
Perry H. Pattison
ATTORNEY Dec. 5, 1933.  G. E. COOK  1,938,416
VENDING MACHINE
Filed Jan. 29, 1930   3 Sheets-Sheet 3
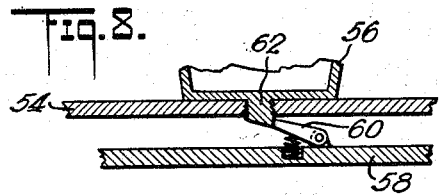
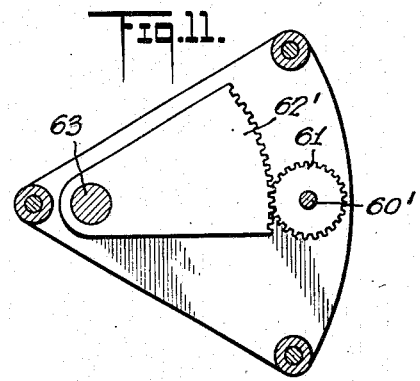
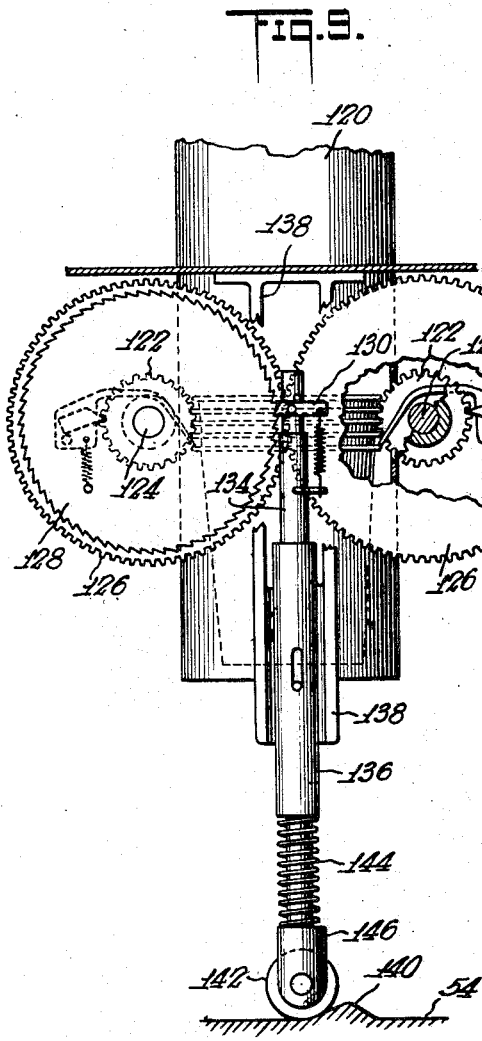
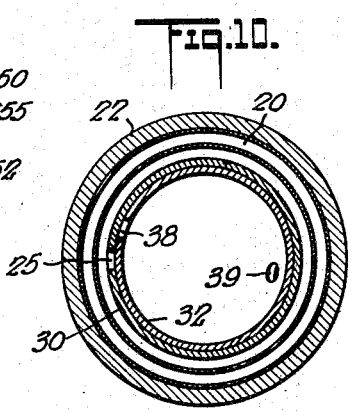
INVENTOR
George E. Cook
BY
ATTORNEY Patented Dec. 5, 1933

1,938,416

UNITED STATES PATENT OFFICE 1,938,416

VENDING MACHINE

George E. Cook, Jackson Heights, N. Y.

Application January 29, 1930. Serial No. 424,249

2 Claims. (Cl. 312—44)

The present invention relates to new and useful improvements in coin controlled machines, and it pertains more particularly to machines of this character for dispensing beverages or other liquids.

It is one of the objects of the invention to provide a machine of the above described character which may be set up in public places for the purpose of dispensing beverages to the public and in which the purchaser of a drink operates the machine to carry out the several operations thereof.

It is a further object of the invention to provide a new and improved mechanism in a machine of the class described, for dispensing a predetermined amount or volume of liquid.

It is a still further object of the invention to provide a new and novel means for positioning a container such for example as a cup in position to receive the liquid from the dispensing mechanism.

It is a further object of the invention so to construct a suitable discharge valve especially adapted for use in combination with thermos containers, and so to arrange said valve that there will be no change in the temperature of the contents of the vacuum container due to thermal conductivity on the part of the discharge valve.

With the above and other objects in view, the invention comprises the novel and improved features, construction and combination of parts hereinafter described, and pointed out in the claims, the advantages of which will be clearly understood and appreciated by those skilled in the art.

The invention will be clearly understood from the accompanying drawings illustrating the invention in its preferred form and from the following description of the constructions therein shown in the drawings—

Figure 1 is a view in front elevation of the machine constructed in accordance with the present invention, Figure 2 is a vertical sectional view thereof taken on the line 2—2 of Figure 1, Figure 2a is an enlarged detail sectional view of the valve mechanism, Figure 3 is a horizontal sectional view taken on the line 3—3 of Figure 2, Figure 4 is an enlarged detail sectional view of the coin actuated mechanism, Figure 5 is a detail horizontal sectional view taken on the line 5—5 of Figure 4, Figure 6 is an enlarged detail sectional view, Figure 7 is an enlarged detail sectional view taken on the line 7—7 of Figure 2, Figure 8 is an enlarged detail sectional view, of the means employed to hold the table against rotation in one direction.

Figure 9 is an enlarged sectional view taken on the line 9—9 of Figure 2, and;

Figure 10 is a horizontal sectional view taken on the line 10—10 of Figure 2.

Figure 11 is a detail horizontal sectional view taken on the line 11—11 of Figure 2.

The machine embodying the invention as illustrated in the drawings, comprises a base 12, upon which is supported a housing 14 of domelike form. The housing is provided in its front portion with a door opening 16, and for opening and closing said door opening 16, there is a circumferentially movable door 18. The means by which this door is operated will be described more in detail hereinafter.

As clearly shown in Figure 2, of the drawings, a suitable container, preferably in the form of a vacuum bottle 20 is mounted in the housing 14. This container is carried by a suitable means 22 which has supporting engagement with a partition 26 in the housing 14. It is to be understood however that the specific manner in which the container is supported is immaterial, and that any suitable means of support therefor may be resorted to without departing from the spirit of the invention.

In Figure 2a of the drawings is shown a valve A by means of which the discharge of liquid from the container 20 is controlled. The construction shown is the one preferred at this time, and it comprises an immovable member 30, and a rotating or oscillating member 32. The stationary or immovable member 30 is preferably carried by container supporting means 22 and is secured thereto by any suitable means such as bolts 23. This member 30 projects inwardly of the container 20, and is provided in its inner end with an inlet opening 25. The inner member 32 conforms in shape to the member 30 and is received therein as shown. This inner member 32 is retained in position in the member 30 by means of a cap plate or the like 34, slidably mounted upon bolts 35 and forced against the lower end of the inner member 32 by springs 36, the tension of which may be adjusted by nuts 37, upon said bolts 35. From the foregoing, it will be readily apparent that by adjustment of the tension of the springs 36, a fluid tight joint may be maintained between the two members 30 and 32 of the discharge valve A, and at the same time permit of free rotation of the inner member 32 thereof. The inner member 32 of the valve A is provided with an opening 38 in its upper end which upon proper rotation of the member 32 registers with the heretofore mentioned opening 25 in the member 30 and when in registration therewith, permits a flow of liquid from the container 20 to the interior of the valve A. The inner member 32 is provided in its lower end with an opening 39 which upon proper operation of said inner member, registers with a discharge pipe 40 carried by the cap plate 34. A vent pipe 41 extends from the inner member through the upper wall of the container thus insuring prompt draining of the inner member 32 when its opening 39 is in registration with the discharge pipe 40. A shaft 42 which extends to a suitable operating means to be hereinafter described provides the means by which the inner member 32 is operated.

The arrangement of the valve in such a manner that it occupies a position almost wholly within the vacuum container is considered important since this arrangement effectively prevents changes in the temperature of the liquid within the container by conductivity and at the same time provides a highly practical means for discharging the liquid in measured quantities.

The discharge spout 40 heretofore referred to is adapted to discharge the contents of the measuring valve A into cups or the like B which are successively positioned therebeneath in a manner to be now described. Mounted for rotatory movement upon a suitable bearing 52, there is a table 54, and this table is provided near its peripheral edge, with spaced cup receiving pockets 56 into which the cups B are adapted to be deposited by a mechanism to be hereinafter described in detail. Suitable means for imparting rotatory movement to the table 54 is employed and one such means is shown in Figure 8, and in this mechanism an arm 58 carries a spring pressed dog 60 which singly engages lugs 62 upon the under face of the table 54, and serves to move the latter in a step by step manner upon movement of the arm 58. To prevent retractile movement of the table, a second spring pressed dog 165 is adapted for engagement with the lugs 62, see Figure 6, this last mentioned spring pressed dog being positioned substantially diametrically opposite with respect to the aforementioned spring pressed dog 60. It is obvious that if desired the spring pressed dog 165 may be discarded and the table may be moved only one step forward manually and returned to initial position in any suitable manner.

By reference to Figure 2, it may be noted that the shaft 42 is connected to a second shaft 60' by a coupling 42'. This construction permits of removal of the container and valve A when desired. Carried by the lower end of the shaft 60', there is a gear 61, see Figure 11, and this gear 61 meshes with the teeth of a segment 62' carried by a shaft 63. This shaft 63 is mounted for rotary movement in a sleeve-like member 64 mounted in the heretofore mentioned bearing 52. As shown in Figure 7 of the drawings, the arm 58 is mounted for rotary movement about this sleeve 64, and is secured to the shaft 63 by a suitable screw or bolt 65. This screw or bolt 65 operates through a cutout portion 66 in the sleeve 64 as in Figure 7, and the end walls of the cut-out portion 66 form stops to limit the rotary movement of the arm 58 and shaft 63 by reason of engagement of the screw of bolt therewith.

By the construction thus far described, it is obvious that each time the table 54 is moved in a clockwise direction, it will be moved one step, a cup B will be positioned beneath the discharge spout 40 of the measuring valve A, and the measuring valve A will be positioned to discharge its contents through the discharge spout 40 into the cup B, positioned therebeneath.

By reference to Figure 5, it will be apparent that the arm 58 carries on its outer end, an operating knob or handle 80, and a plate 82 which in turn is provided with a coin recess 84. The door 18 heretofore mentioned is secured as at 86 to the outer end of the arm 58, and this door 18 is provided near its bottom edge with a slot 88. Projecting into this slot 88, there is a spring pressed sliding dog 90 mounted in a suitable housing 94, and forced forwardly into position by the spring 92. This dog 90 prevents movement of the door 18 to the position where access to a cup B is had, except under certain conditions, and inasmuch as the door is carried by the arm 58, movement of the said arm, sufficient to operate the table 54 is prevented except under conditions to be now described. In the alternative form mentioned the foregoing elements will it is understood, be carried by the table 54 except for the spring pressed dog 90.

As heretofore stated, the table 54 is held against movement to a position where the door 18 will be opened to permit of the operator grasping a cup, by means of the spring pressed dog 90 engaging in the slot 88. If, however, a coin be inserted in the coin recess 84, upon movement of the arm 58 in a clockwise direction, the coin will engage a roller abutment such as 100 carried by the spring pressed dog 90, and its inner end will be moved out of the slot 88, and permit of a full movement of the arm 58. A full movement of the arm 58 moves the door 18 to full open position to give access to a cup B. Simultaneously with the door moving to open position, the shaft 42 of the measuring valve A is operated through the medium of the set screw 65 and its associated parts, and the parts of the measuring valve A are moved to the position shown in Figure 10, in which position the contents are discharged into the cup B which is exposed for removal.

During movement of the table 54, the set screw 65 engages the wall 102 of the cut-out portion 66, see Figure 7, to limit its movement, which movement is, however sufficient to move a cup B to position beneath the discharge spout 40. This positioning of a cup B beneath the discharge spout 40, is accomplished by engagement of the dog 60 with the lugs 62 as heretofore described. The arm 58 is returned to its normal position by a coil spring 106, which has one end attached to said arm as at 108, Figure 5, the other end being attached to any suitable stationary point of the machine, and the normal position of the table 54 is determined by engagement of the set screw 65 with the wall 110 of the cut-out portion 66, see Figure 7. Movement of the arm 58 under the influence of the spring 106 is controlled by a dash pot 111, see Figure 5.

When the table 54 has reached the end of its movement in the clockwise direction, the coin drops through the opening 114 into the chute 116, by which it is conveyed to a money drawer 118 where it is deposited for collection, it being understood that the money drawer is removably carried by the machine.

As more clearly shown in Figure 3, the cup receiving pockets 56 are separated by means of partitions 112, thus preventing the removal of the cup adjacent the one exposed for removal. While these partitions are shown as of curved form, it is to be understood that they may be of other form if desired.

By reference to Figure 2, it will be noted that the cups B are carried in a relatively long tubular member 120, the said cups being arranged therein in nested relation. The column of cups is supported by two toothed wheels or gears 122 carried on shafts 124. Also carried on the shafts 124, are meshing gears 126 which provide the means for driving said shafts 124 and toothed wheels 122 in unison. Mounted upon one of the shafts 124, there is a ratchet wheel 128, and it serves to drive the shaft to which it is attached. The ratchet wheel 128 is driven by a pawl 130 pivotally mounted on a vertically moving rod or the like 134, said rod 134 being mounted in a suitable guide 136 carried by a bracket 138. The rod 134 is moved upwardly by means of a cam 140 carried by the table 54, said cam riding under a roller 142 carried by the lower end of said rod 134. The roller is maintained in engagement with the table 54 by means of a coil spring 144 surrounding the rod 132 and interposed between the lower end of the guide 136 and the roller mounting 146. It is to be understood that the cams 140 are arranged in a circular series in spaced relation on the top of the table 54, and their position is such that upon each operation of the table, a cup pocket will be positioned beneath the column of cups, and a cup will be deposited therein. It will thus be apparent that upon each operation of the machine, a cup will be deposited in an empty cup pocket to be moved to the filling position upon subsequent operations of the machine. It is obvious that in the alternative construction only one cam will be needed since the table returns to initial position after each operation.

Associated with each of the gears 122 there is a pivotally mounted cup releasing finger 150 adapted to be moved about its pivotal point in one direction by a spring 152. The free end of each of these members is adapted to engage the upper edge of the bottom cup in the cup container 120 and impart thereto a sharp blow which insures its disengagement relative to the cup immediately above it. Movement of the fingers 150 is had by means of a dog or pawl 155 there being one carried by each finger 150, and these dogs or pawls engage the teeth of their respective gears 122. Hence as the gears 122 are rotated each tooth as it passes its respective dog 155 places its spring 152 under tension and as soon as the tooth passes free of the dog 155, it is given a sudden return movement under the influence of its spring 152 and imparts a dislodging blow to the bottom cup in the container 120.

The spring pressed dog 165 heretofore mentioned, is released to permit of free movement of the table 54 by means of a suitable cam 160 carried by the arm 58 and which engages a roller 162 mounted on a short shaft 164 carried by the dog 165.

From the foregoing it will be apparent that that present invention provides a new and improved machine for the dispensing of beverages which upon proper operation will fill a suitable container with a beverage, and position the filled container in such a manner as to permit of its removal from the machine.

Having explained the nature and objects of the invention, and having specifically described a construction embodying the invention in a preferred form, what is claimed is:

1. A cup dispensing mechanism comprising a housing carrying a plurality of cups in nested relation, a toothed member for feeding the cups as a group toward the discharge end of said housing, and a spring retracted finger operable by said member during the feeding action thereof to successively raise and release the finger for striking the lowermost cup to dislodge the same from the group.

2. A cup dispensing mechanism comprising a housing carrying a plurality of cups in nested relation, a plurality of toothed wheels engaging the cups for feeding the same as a group toward the discharge end of said housing, a plurality of spring retracted fingers mounted adjacent said wheels and adapted to strip the lowermost cup from the group, said fingers being operable by the wheels for successively raising and releasing the fingers whereby to impart a sharp blow upon said lowermost cup and means for intermittently actuating said wheels in unison.

GEORGE E. COOK.